(12) United States Patent
Barbar

(10) Patent No.: US 8,324,772 B2
(45) Date of Patent: Dec. 4, 2012

(54) ELECTRICAL GENERATOR

(76) Inventor: Dominic Munib Barbar, Beverly Hills, CA (US)

( * ) Notice: Subject to any disclaimer, the term of this patent is extended or adjusted under 35 U.S.C. 154(b) by 362 days.

(21) Appl. No.: 12/801,946

(22) Filed: Jul. 2, 2010

(65) Prior Publication Data

US 2011/0084497 A1 Apr. 14, 2011

Related U.S. Application Data

(60) Provisional application No. 61/272,640, filed on Oct. 14, 2009.

(51) Int. Cl.
*H02K 7/18* (2006.01)
(52) U.S. Cl. .......... 310/75 C; 310/15; 290/1 R; 290/1 A
(58) Field of Classification Search ................ 310/75 R, 310/75 A, 67 A, 75 C, 15, 36, 168; 290/1 R, 290/1 A; 180/206.5, 206.6
See application file for complete search history.

(56) References Cited

U.S. PATENT DOCUMENTS

| | | | |
|---|---|---|---|
| 4,761,577 A | 8/1988 | Thomas et al. | |
| 5,268,602 A | 12/1993 | Schwaller | |
| 5,631,507 A | 5/1997 | Bajric et al. | |
| 5,986,370 A | 11/1999 | Cheng | |
| 6,291,901 B1 * | 9/2001 | Cefo | 290/1 R |
| 6,803,696 B2 | 10/2004 | Chen | |
| 6,836,035 B1 | 12/2004 | Pawletko | |
| 7,023,122 B2 | 4/2006 | Gang | |
| 2004/0100100 A1 * | 5/2004 | Wilson | 290/1 R |
| 2007/0170791 A1 | 7/2007 | Hargett | |
| 2007/0188037 A1 | 8/2007 | Lau | |
| 2007/0252452 A1 | 11/2007 | Ishimoto et al. | |
| 2007/0296313 A1 | 12/2007 | Wang | |
| 2008/0093955 A1 * | 4/2008 | Lunde | 310/67 A |
| 2008/0174210 A1 | 7/2008 | Kitamura | |
| 2008/0224557 A1 | 9/2008 | Cleveland | |

FOREIGN PATENT DOCUMENTS

| | | |
|---|---|---|
| JP | 55144744 A | 11/1980 |
| JP | 58095965 A | 6/1983 |

* cited by examiner

*Primary Examiner* — Quyen Leung
*Assistant Examiner* — Leda Pham
(74) *Attorney, Agent, or Firm* — Richard C. Litman

(57) ABSTRACT

The electrical generator allows energy to be recovered and stored from a rotating wheel, cam, gear or the like. The electrical generator includes at least one hollow tube mounted radially on a wheel rim. The wheel rim has a central portion and a circumferential edge, and the hollow tube has opposed first and second ends, respectively positioned adjacent the central portion and the circumferential edge of the wheel rim. At least one first elastic member and at least one second elastic member are mounted within the hollow tube and respectively cover the first and second ends thereof. At least one magnet is slidably received within the hollow tube, and at least one induction coil is mounted about an exterior surface of the hollow tube. An AC to DC converter is in communication with the induction coil, and an electrical battery is in communication with the AC to DC converter.

16 Claims, 1 Drawing Sheet

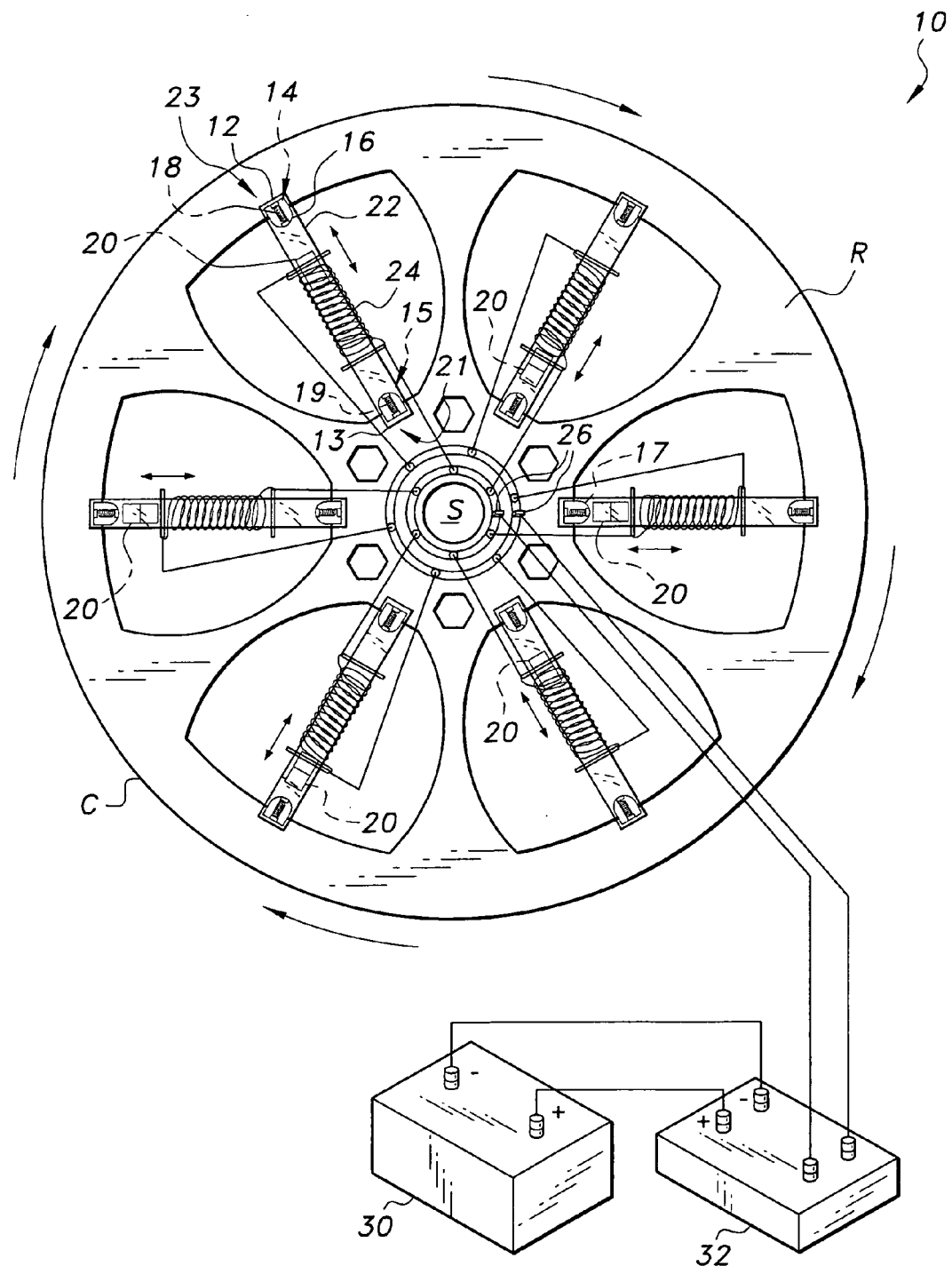

ELECTRICAL GENERATOR

CROSS-REFERENCE TO RELATED APPLICATION

This application claims the benefit of U.S. Provisional Patent Application Ser. No. 61/272,640, filed Oct. 14, 2009.

BACKGROUND OF THE INVENTION

1. Field of the Invention

The present invention relates to electrical generators and, particularly, to an electrical generator for recovering and storing energy from a rotating wheel, cam, gear or the like or a pre-existing machine.

2. Description of the Related Art

Due to environmental and geopolitical concerns, there is an increased urgency to develop alternative energy sources to fossil fuels and, particularly, to recycle or recover energy. Hybrid vehicles, utilizing a combination of fossil-fueled engines and electric drive systems, greatly increase the distance one can travel on a gallon of fossil fuel. One such vehicle includes an electric motor for each wheel, with the motors being driven by a generator, which, in turn, is driven by a fossil-fuel engine. In such a vehicle, the engine can be run solely for the benefit of the generator and, therefore, can be small and run at a constant, most efficient speed, greatly reducing fossil fuel requirements.

Hybrid vehicles often include energy recovery systems, such as regenerative braking, for example. In a traditional braking system, brake pads produce friction with the brake rotors to slow or stop the vehicle. Additional friction is produced between the slowed wheels and the surface of the road. This friction converts the vehicle's kinetic energy into heat. With regenerative brakes, the system that drives the vehicle performs the majority of the braking.

When the driver of the vehicle steps on the brake pedal of an electric or hybrid vehicle, regenerative brakes put the vehicle's electric motor into reverse mode, causing the motor to run backwards, thus slowing the vehicle's wheels. While running backwards, the motor also acts as an electric generator, producing electricity that is then fed into the vehicle's batteries. These types of brakes work more efficiently at certain speeds. They are, in fact, most effective in stop-and-go driving situations.

At present, regenerative systems are, primarily, limited to only the braking system, such as that described above. Further, such systems cannot be easily applied to other types of vehicles, or to general machines having rotating elements. It would be desirable to apply a comparable principle of energy recovery to generalized machines, with a wider array of energy recovery options being available.

Thus, an electrical generator solving the aforementioned problems is desired.

SUMMARY OF THE INVENTION

The electrical generator allows energy to be recovered and stored from a rotating wheel, cam, gear or the like. The electrical generator includes at least one hollow tube mounted radially on a wheel rim. The wheel rim may be a pre-existing wheel rim, such as that associated with an automobile tire or a bicycle, for example, or may be a wheel rim which is adapted to be mounted onto a rotating element of a machine, such as pre-existing wheel, cam, gear or the like.

The wheel rim has a central portion and a circumferential edge, and the at least one hollow tube has opposed first and second ends, with the first end thereof being positioned adjacent the central portion of the wheel rim and the second end thereof being positioned adjacent the circumferential edge of the wheel rim. Preferably, at least one recess is formed in the circumferential edge of the wheel rim, and the second end of the hollow tube is mounted within the recess.

At least one first elastic member and at least one second elastic member are mounted within the at least one hollow tube and respectively cover the first and second ends thereof. Each elastic member preferably includes a hollow cap formed from an elastomeric material with a spring or the like being mounted within the hollow cap.

At least one magnet is slidably received within the at least one hollow tube, and at least one induction coil is mounted about an exterior surface of the at least one hollow tube. A central rotational commutator is mounted in the central portion of the wheel rim, with at least one rotating electrical brush being secured thereto. The at least one rotating electrical brush is in electrical communication with the at least one induction coil. An AC to DC converter is in electrical communication with the at least one rotating electrical brush, and at least one electrical battery is in electrical communication with the AC to DC converter. In use, rotation of the wheel rim causes oscillatory motion of the at least one magnet within the at least one hollow tube. The regular, oscillatory sliding movement thereof with respect to the induction coil generates alternating electrical current via electromagnetic induction. The alternating electrical current is converted to direct electrical current by the AC to DC converter, and the recovered electrical energy is stored in the at least one battery.

These and other features of the present invention will become readily apparent upon further review of the following specification and drawings.

BRIEF DESCRIPTION OF THE DRAWINGS

The Sole FIGURE is a diagrammatic view of an electrical generator according to the present invention.

DETAILED DESCRIPTION OF THE PREFERRED EMBODIMENTS

The electrical generator 10 allows energy to be recovered and stored from a rotating wheel, cam, gear or the like of a pre-existing machine. As shown in the sole drawing FIGURE, the electrical generator 10 includes at least one hollow tube 22 mounted radially on a wheel rim R. The wheel rim R may be a pre-existing wheel rim, such as that associated with an automobile tire, or may be a wheel rim that is adapted to be mounted onto a rotating element of a machine, such as pre-existing wheel, cam, gear or the like.

The wheel rim R has a central portion for receiving a central shaft S and a circumferential edge C. The at least one hollow tube 22 has opposed first and second ends 21, 23, respectively, with the first end 21 being positioned adjacent the central portion of the wheel rim R and the second end 23 being positioned adjacent the circumferential edge C of the wheel rim R. Preferably, at least one recess 12 is formed in the circumferential edge C of the wheel rim R, and the second end 23 of the hollow tube 22 is mounted within the recess 12. The first end 21 thereof is preferably, similarly, mounted within a corresponding recess 13, formed adjacent the central portion of wheel rim R. In the sole FIGURE, six such hollow tubes 22 are shown mounted on wheel rim R (with the second ends 23 thereof being received in six corresponding recesses 12). It should be understood that any desired number of hollow tubes 22 may be radially mounted on wheel rim R. Further, the lengths and relative dimensions of the hollow tubes 22 are dependent upon the size of the wheel rim R and the particular application thereof. The hollow tube 22 may be formed from any suitable material, which is preferably a dielectric material.

At least one first elastic member 15 and at least one second elastic member 14 are mounted within the at least one hollow tube 22 and cover the first and second ends 21, 23, respectively. Elastic members 14, 15 may be formed from any suitable elastic material. Preferably, as shown, each elastic member 14, 15 includes a hollow cap 16, 17, respectively, formed from an elastomeric material, such as rubber or the like, with a spring 18, 19, respectively, or the like being mounted within the hollow cap 16, 17.

At least one magnet 20 is slidably received within the at least one hollow tube 22. Hollow tube 22 and magnet 20 may have any desired contouring, but, in the preferred embodiment, each preferably has a substantially cylindrical contour. Magnet 20 may be any suitable type of permanent magnet. At least one induction coil 24 is mounted about an exterior surface of the at least one hollow tube 22. As shown, induction coil 24 is preferably mounted substantially centrally about the hollow tube 22.

A central rotational commutator is mounted in the central portion of the wheel rim R, about the shaft S thereof, with at least one rotating electrical brush 26 being secured thereto, as is known in the art. Any suitable type of brush may be utilized for sustaining electrical contact throughout rotation of the wheel rim R about the commutator and shaft S. The at least one rotating electrical brush 26 is in electrical communication with the at least one induction coil 24. An AC to DC converter 32, which may be any suitable type of AC to DC converter 32, is in electrical communication with the at least one rotating electrical brush 26, and at least one electrical battery 30 is in electrical communication with the AC to DC converter 32.

In operation, rotation of the wheel rim R (indicated by directional arrows in the sole FIGURE) causes oscillatory motion of the at least one magnet 20 within the at least one hollow tube 22 (also indicated by directional arrows in the FIGURE). The regular, oscillatory sliding movement thereof with respect to the induction coil 24 generates alternating electrical current via electromagnetic induction. The natural tendency of magnet 20 to remain within the second end 23 of the hollow tube 22, due to centrifugal force, is overcome by the first and second elastic members 15, 16, with the magnet 20 sliding therebetween at a substantially regular frequency (which is determined by the angular velocity of the wheel rim R). The alternating electrical current generated by induction in the induction coil 24 is converted to direct electrical current by the AC to DC converter 32, and the recovered electrical energy is stored in the at least one battery 30.

It is to be understood that the present invention is not limited to the embodiments described above, but encompasses any and all embodiments within the scope of the following claims.

I claim:

1. An electrical generator, comprising:
    a wheel rim adapted for rotational mounting on a central shaft;
    at least one hollow tube mounted radially on the wheel rim, the at least one hollow tube having opposed first and second ends, the first end being positioned adjacent the central shaft, the second end being positioned adjacent a circumferential edge of the wheel rim, wherein the second end is received within at least one circumferential recess formed in the circumferential edge of the wheel rim;
    at least one first elastic member and at least one second elastic member mounted within the at least one hollow tube and respectively covering the first and second ends thereof;
    at least one magnet slidably received within the at least one hollow tube;
    at least one induction coil mounted about an exterior surface of the at least one hollow tube; and
    at least one electrical battery in electrical communication with the at least one induction coil;
    wherein rotation of the wheel rim causes oscillatory motion of the at least one magnet within the at least one hollow tube, generating electrical current via electromagnetic induction.

2. The electrical generator as recited in claim 1, wherein the first end of the at least one hollow tube is received within at least one central recess formed adjacent the central shaft.

3. The electrical generator as recited in claim 1, wherein each of said first and second elastic members comprise:
    a cap formed from an elastic material; and
    a spring mounted within the cap.

4. The electrical generator as recited in claim 1, further comprising a rotating electrical brush mounted about the central shaft, said at least one induction coil being in electrical communication therewith.

5. The electrical generator as recited in claim 4, further comprising an AC-to-DC converter connected in series between the rotating brush and the at least one electrical battery.

6. An electrical generator, comprising:
    a wheel rim having a central portion and a circumferential edge;
    at least one hollow tube mounted radially on the wheel rim, the at least one hollow tube having opposed first and second ends, the first end being positioned adjacent the central portion, the second end being positioned adjacent the circumferential edge of the wheel rim;
    at least one first elastic member and at least one second elastic member being mounted within the at least one hollow tube and respectively covering the first and second ends thereof;
    at least one magnet slidably received within the at least one hollow tube;
    at least one induction coil mounted about an exterior surface of the at least one hollow tube;
    a central rotational commutator mounted in the central portion of the wheel rim and at least one rotating electrical brush being secured thereto, the at least one rotating electrical brush being in electrical communication with the at least one induction coil;
    an AC to DC converter in electrical communication with the at least one rotating electrical brush; and
    at least one electrical battery in electrical communication with the AC to DC converter;
    wherein rotation of the wheel rim causes oscillatory motion of the at least one magnet within the at least one hollow tube, generating alternating electrical current via electromagnetic induction, the alternating electrical current being converted to direct electrical current by the AC to DC converter.

7. The electrical generator as recited in claim 6, wherein the second end of the at least one hollow tube is received within at least one recess formed in the circumferential edge of said wheel rim.

8. The electrical generator as recited in claim 7, wherein the first end of the at least one hollow tube is received within at least one central recess formed adjacent the central portion of said wheel rim.

9. The electrical generator as recited in claim 8, wherein each of said first and second elastic members comprise:
a cap formed from an elastic material; and
a spring mounted within the cap.

10. The electrical generator as recited in claim 9, wherein said at least one hollow tube has a substantially cylindrical contour.

11. The electrical generator as recited in claim 10, wherein said at least one magnet has a substantially cylindrical contour.

12. An electrical generator, comprising:
a wheel rim having a central portion and a circumferential edge;
at least one hollow tube mounted radially on the wheel rim, the at least one hollow tube having opposed first and second ends, the first end being positioned adjacent the central portion, the second end being positioned adjacent the circumferential edge of the wheel rim, the at least one hollow tube having a substantially cylindrical contour;
at least one first elastic member and at least one second elastic member being mounted within the at least one hollow tube and respectively covering the first and second ends thereof;
at least one magnet slidably received within the at least one hollow tube;
at least one induction coil mounted about an exterior surface of the at least one hollow tube;
a central rotational commutator mounted in the central portion of the wheel rim and at least one rotating electrical brush secured thereto, the at least one rotating electrical brush being in electrical communication with the at least one induction coil;
an AC to DC converter in electrical communication with the at least one rotating electrical brush; and
at least one electrical battery in electrical communication with the AC to DC converter;
wherein rotation of the wheel rim causes oscillatory motion of the at least one magnet within the at least one hollow tube, generating alternating electrical current via electromagnetic induction, the alternating electrical current being converted to direct electrical current by the AC to DC converter.

13. The electrical generator as recited in claim 12, wherein the second end of the at least one hollow tube is received within at least one recess formed in the circumferential edge of said wheel rim.

14. The electrical generator as recited in claim 13, wherein the first end of the at least one hollow tube is received within at least one central recess formed adjacent the central portion of said wheel rim.

15. The electrical generator as recited in claim 14, wherein each of said first and second elastic members comprise:
a cap formed from an elastic material; and
a spring mounted within the cap.

16. The electrical generator as recited in claim 15, wherein said at least one magnet has a substantially cylindrical contour.

* * * * *